United States Patent

Miller, Jr. et al.

[11] Patent Number: 5,580,105
[45] Date of Patent: Dec. 3, 1996

[54] LOCKING ARRANGEMENT FOR A PLUMBING CONNECTION

[75] Inventors: Leonard L. Miller, Jr.; Tracy A. Presnell, both of McPherson, Kans.

[73] Assignee: Midtec, Inc. of America, McPherson, Kans.

[21] Appl. No.: 371,840

[22] Filed: Jan. 12, 1995

[51] Int. Cl.$^6$ ...................................................... F16L 21/06
[52] U.S. Cl. ........................... 285/322; 285/385; 285/354
[58] Field of Search ..................................... 285/322, 323, 285/382.7, 353, 354, 342, 243, 385, 421, 93

[56] References Cited

U.S. PATENT DOCUMENTS

| | | |
|---|---|---|
| 3,234,963 | 2/1966 | Lyon . |
| 3,294,425 | 12/1966 | Lyon ................................... 285/382.7 |
| 3,454,290 | 7/1969 | Tairraz ................................ 285/323 X |
| 3,563,265 | 2/1971 | Graham . |
| 3,884,513 | 5/1975 | Gassert ................................... 285/322 |
| 3,989,283 | 11/1976 | Pepper ................................... 285/323 |
| 4,030,741 | 6/1977 | Fidrych ................................... 285/322 |
| 4,043,576 | 8/1977 | Reich et al. ........................... 285/322 |
| 4,306,587 | 12/1981 | Tchebinyayeff . |
| 4,613,158 | 9/1986 | Ekman ................................. 285/382.7 |
| 4,685,706 | 8/1987 | Kowal et al. ........................... 285/322 |
| 4,807,911 | 2/1989 | Short ................................... 285/323 |
| 4,848,391 | 7/1989 | Miller et al. . |
| 4,871,196 | 10/1989 | Kingsford ............................ 285/323 X |
| 5,174,611 | 12/1992 | Byrd et al. ............................... 285/323 |
| 5,190,324 | 3/1993 | Bird et al. ............................... 285/328 |

FOREIGN PATENT DOCUMENTS

| | | |
|---|---|---|
| 133670 | 3/1946 | Australia ............................... 285/323 |
| 287303 | 8/1965 | Australia ............................... 285/323 |
| 920912 | 2/1973 | Canada . |
| 0052717A1 | 6/1982 | European Pat. Off. . |

Primary Examiner—Terry Lee Melius
Assistant Examiner—Heather Shackelford
Attorney, Agent, or Firm—Shook, Hardy & Bacon L.L.P.

[57] ABSTRACT

A locking device for securing a tube to a threaded nipple has a threaded nut for mating with the threaded nipple. The nut has a through opening formed therein and a camming surface formed in the opening. A locking member has a first body section adopted to be positioned over the tube and received in the opening of the nut. The locking member also has a second body section extending away from the first body section and presenting an inclined surface positioned for engagement by the camming surface. A gripper component extends from an inner surface of the second body section for engagement with the tube. When the nut is threadably received on the nipple, movement of the tube away from the nipple results in the inclined surface engaging the camming surface to cause the gripper component to tightly engage the outer surface of the tube.

5 Claims, 2 Drawing Sheets

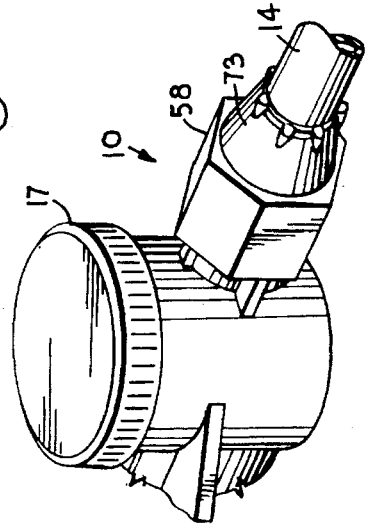
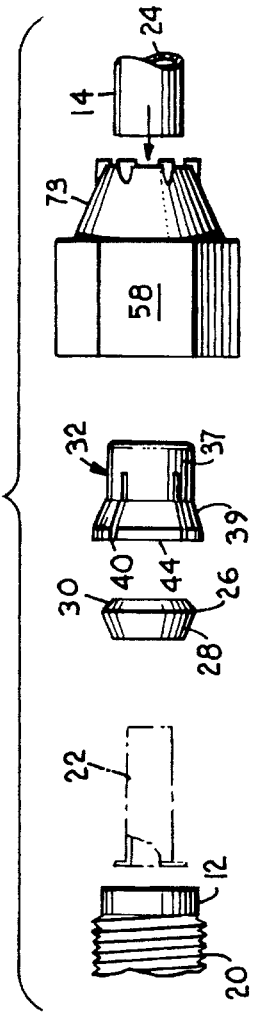
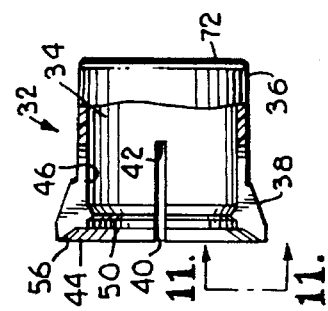
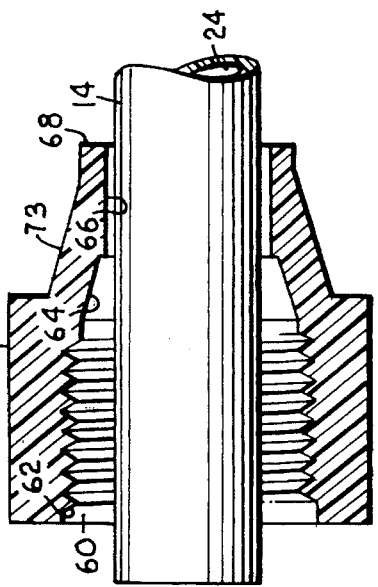
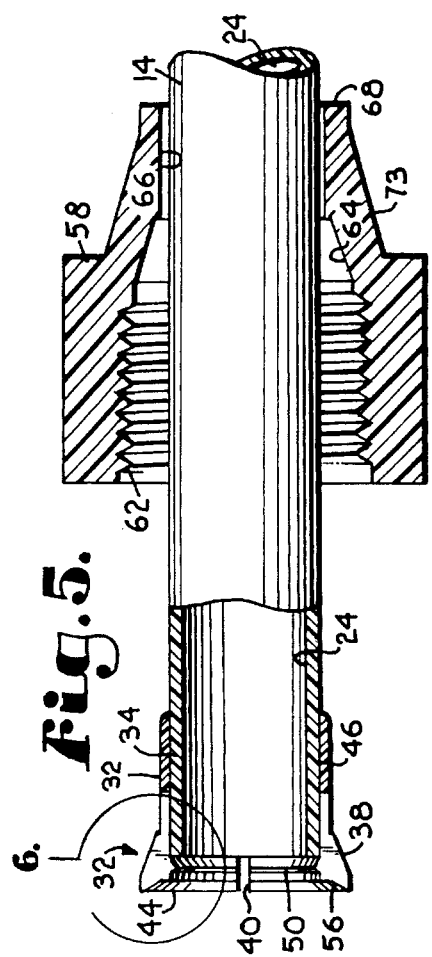
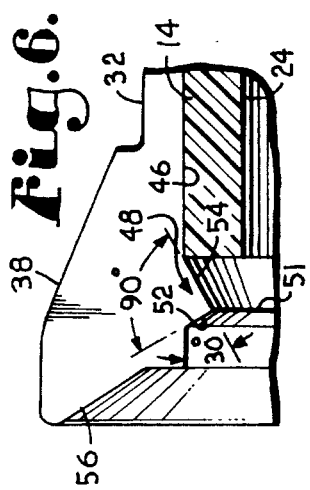

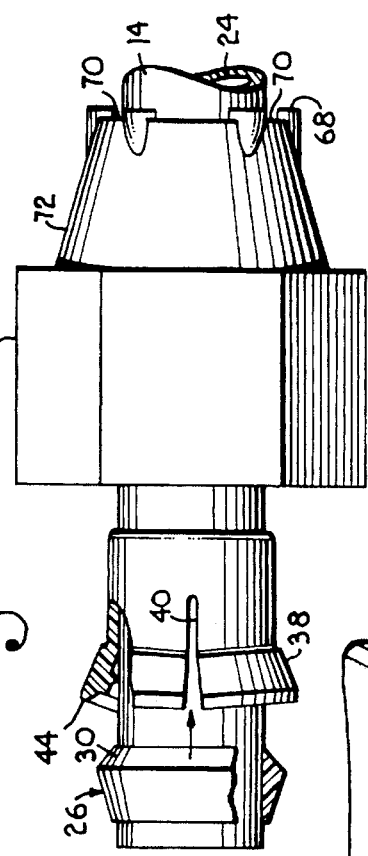
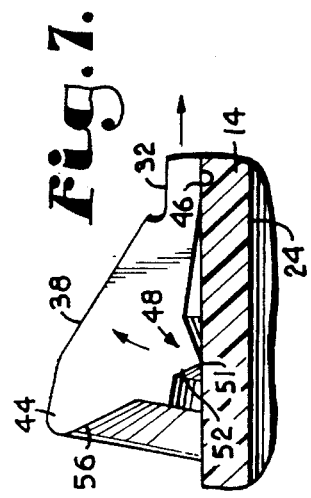
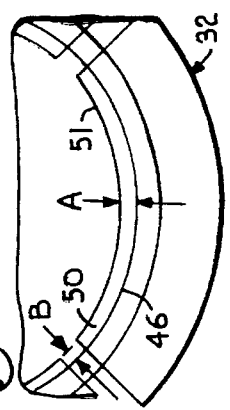
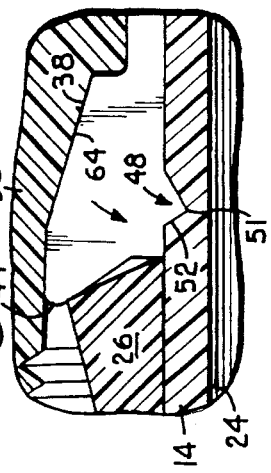
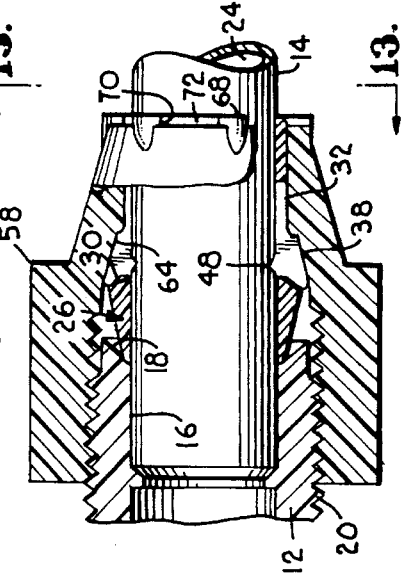
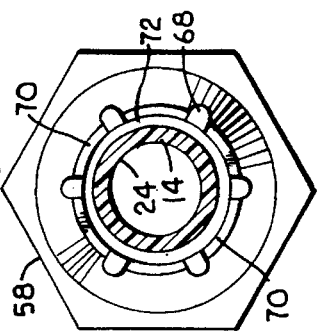
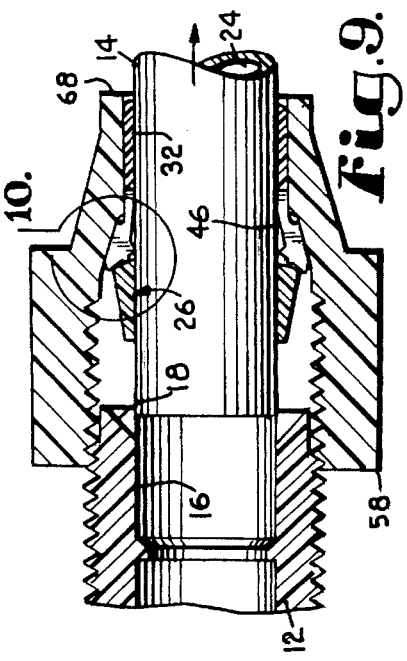

LOCKING ARRANGEMENT FOR A PLUMBING CONNECTION

This invention relates to a locking arrangement which is used to connect a tube to the port of a threaded nipple so that accidental disengagement of the tube from the port is prevented.

In many plumbing applications it is necessary to attach a tube or pipe to a nipple of a plumbing structure (for example, a valve, manifold, or faucet) so that the tube is in fluid communication with a port contained within the nipple to supply or remove fluid from the structure. For instance, U.S. Pat. No. 4,848,391, which is incorporated by reference herein, discloses a fluid delivery manifold especially designed for water systems in buildings and residences wherein fluid is supplied to and removed from the manifold by conduits or tubes which are attached to and in fluid communication with threaded nipples formed integrally with the manifold.

In prior art connecting arrangements, conduits or tubes have been secured to threaded nipples by the use of threaded tightening nuts in conjunction with an annular ferrule. More particularly, the ferrule snugly surrounds the tube and has an inclined outer surface which allows the ferrule to be wedged between the tube and the port of the nipple as the nut is tightened. The wedging of the ferrule between the tube and the port supplies the sealing action between the tube and the port, and further, provides the securement of the tube to the nipple so that it cannot be longitudinally dislodged therefrom. The attaching arrangement described above has a major disadvantage in that the threaded nut must be snugly tightened on the nipple in order to adequately wedge the ferrule into position to prevent unwanted longitudinal dislodgement of the tube from the port. Thus, before the tightening of the nut, the tube is often accidentally knocked out of the port or falls out of the port due to gravity. Further, if the nut is not adequately tightened and the tube is pressurized with a fluid, the tube is often disengaged from the nipple due to the force of the fluid. This latter situation often involves the spillage of water or other fluids to the environment surrounding the plumbing structures, thus requiring substantial cleanup and possible water damage.

An additional disadvantage associated with the prior art connecting structure described above is that a person using the connecting arrangement is oftentimes unable to determine whether the nut is adequately tightened to ensure a proper seal and connection.

Thus, a connecting structure is needed which will prevent dislodgment of the tube from the port of a nipple when the nut is not fully tightened. Further, a connecting arrangement is needed wherein the person making the connection will be able to tell from a visual inspection of the connection that the nut has been adequately tightened on the nipple.

Accordingly, it is an object of the present invention to provide a locking device which prevents accidental removal of a tube from a nipple during the connection of the tube to the nipple or because of inadequate or incomplete connection of the tube to the nipple.

A further object of this invention is to provide a locking device that ensures a tube is secured to a nipple once a nut of the device is at least partially threaded on the nipple.

Another object of this invention is to provide a nut with a camming surface which engages an inclined surface of a locking insert to apply an inwardly force to the tube through a gripper component extending from the inner surface of the insert.

A still further object of this invention is to have the gripper component be a ridge that is formed by the intersection of a first inclined ridge surface extending from the inner surface of the insert in one direction and a second greater inclined ridge surface extending from the inner surface in an opposite direction so that the tube is adequately gripped by the ridge when the inward force is applied.

Another object of this invention is to provide a locking device which indicates to the user that the nut is tightened adequately to provide an effective connection.

These and other important aims and objects of the present invention will be further described, or will become apparent from the following description and explanation of the drawing, wherein:

FIG. 1 is a top perspective view of a locking arrangement of the present invention being used to connect a tube to a plumbing structure;

FIG. 2 is a side exploded view of the locking arrangement of the present invention, an alternative stiffener shown in phantom lines;

FIG. 3 is a side elevational view showing the assembly step of positioning the compression nut on the tube, parts being broken away and shown in cross section to reveal details of construction;

FIG. 4 is a side elevational view of the locking insert of the present invention, parts being broken away and shown in cross section to reveal details of construction;

FIG. 5 is a side elevational view showing the assembly step of positioning the locking insert on the tube prior to the engagement of the end of the tube with the ridge of the locking insert, parts being broken away and shown in cross section to reveal the details of construction;

FIG. 6 is an enlarged fragmentary side elevational view of the area designated by the numeral 6 in FIG. 5;

FIG. 7 is a side elevational view similar to that shown in FIG. 6, but showing the insert slid further onto the tube so that the segments of the locking insert are deflected slightly outwardly;

FIG. 8 is a side elevational view showing the assembly step of positioning the ferrule on the tube;

FIG. 9 is a side elevational view of the locking arrangement of the present invention showing the thread of the compression nut partially engaging the thread of the nipple and the locking insert engaging the compression nut to prevent further longitudinal movement of the tube, parts being broken away and shown in cross section to reveal details of construction;

FIG. 10 is an enlarged fragmentary side elevational view of the area designated by the numeral 10 in FIG. 9;

FIG. 11 is an enlarged fragmentary sectional view taken generally along the line 11—11 of FIG. 4;

FIG. 12 is a side elevational view of the locking arrangement of the present invention showing the locking arrangement in its tightened position, parts being broken away and shown in cross section to reveal details of construction; and FIG. 13 is a cross-sectional view taken generally along line 13—13 of FIG. 12.

A locking arrangement embodying the principles of this invention is broadly designated in the drawings by the reference numeral 10. Arrangement 10 is used to secure nipple 12 to fluid supply tube or conduit 14 as best shown in FIGS. 1, 2, and 12. Tube 14 can be made of any suitable plastic material, and can further be made of any suitable metal, for example, copper.

Nipple 12 has port 16 centrally formed therein which is in fluid communication with a plumbing structure 17, for example, a manifold, valve, or faucet as best shown in FIGS. 1 and 12. Port 16 has an inner annular inclined surface 18 formed adjacent a distal end of nipple 12. Nipple 12 also has thread 20 formed on its outer surface.

Tube 14 is disposed in port 16 so that port 16 and tube 14 are in fluid communication, as shown in FIG. 12. Stiffener 22 is disposed in the inner bore 24 of tube 14 adjacent the connected end of the tube as shown in FIG. 2. Stiffener 22 serves to provide a more stable connection between nipple 12 and tube 14, and further, aids in the compliance with various plumbing standards. Stiffener 22 is made of a metal material and normally used when tube 14 is made of a semiflexible plastic material.

Annular ferrule 26 is positioned and fitted snugly around tube 14 as shown in FIGS. 2, 9, and 12. Ferrule 26 has annular inclined surface 28 facing nipple 12. Inclined surface 28 allows ferrule 26 to be wedged between tube 14 and the inner surface of port 16 to provide a seal therebetween and to help secure the connection of the tube and the port, as will be further described below. Ferrule 26 also has annular inclined surface 30 located opposite inclined surface 28. Surface 30 engages other structures of the locking arrangement to force ferrule 26 into position, as will be more fully described below.

With reference to FIGS. 2, 4, 6, and 11, generally annular locking member or insert 32 has through opening 34 formed therein. Insert 32 has cylindrical outer surface 36 extending inwardly from one end and an annular inclined surface 38 located adjacent the other end. With reference to FIG. 2, insert 32 can be divided generally into two sections, a first section 37 having cylindrical surface 36 and a second section 39 having inclined surface 38. Slits 40 extend longitudinally from the end of insert 32 that has surface 38 to locations 42 that are intermediate the longitudinal length of the insert. Further, slits 40 extend laterally from the outer surface of the insert to the bore. Slits 40 are spaced equidistantly around the periphery of insert 32 and preferably are separated from one another by an angle of approximately 90 degrees. Slits 40 serve to separate inclined surface 30 and insert 32 into arcuate segments 44.

Inner generally cylindrical surface 46 is formed in opening 34 and has annular gripping ridge or component 48 extending therefrom as best shown in FIG. 6. Ridge 48 is located radially inwardly from inclined surface 38. Ridge 48 serves to grip the tube in the locking arrangement to prevent dislodgement of the tube, as will be more fully described below. Ridge 48 is divided into arcuate segments 50 contained on segments 40. Ridge 48 is formed by the intersection of inclined annular ridge surface 52 which faces nipple 12 and inclined annular ridge surface 54 which faces the opposite direction. The angle of inclination of ridge surface 52 with respect to inner surface 46 is greater than the angle of inclination of ridge surface 54 with respect to inner surface 46. This arrangement ensures that insert 32 can be easily slid onto tube 14 and that ridge 48 can adequately grip tube 14. Preferably, the inclination angle of ridge surface 54 is approximately in the range of 30 to 33 degrees from inner surface 46 and the inclination angle of ridge surface 52 is in the range of 57 to 60 degrees from the inner surface. As is apparent, ridge surface 52 and ridge surface 54 intersect one another at an angle of approximately 90 degrees as shown in FIG. 6.

With reference to FIGS. 6 and 11, the distance from intersection line or edge 51 to inner surface 46 can vary depending on its location along arcuate segment 50. More particularly, the distance between the line or edge 51 and inner surface 46 is preferably greatest at the center of each segment 50 and gradually decreases toward the end of each segment. For instance, for a tube having a ⅜ inch bore diameter and a ½ inch outer surface diameter, it has been found desirable to have the distance between the intersection line 51 and the inner surface be approximately in the range of 0.019 inches to 0.021 inches in the center of each segment 50 as indicated by the letter A in FIG. 11 and the distance be approximately in the range 0.014 inches to 0.017 inches at the ends of each segment as indicated by the letter B in FIG. 11. Opening 34 of insert 32 also has inner inclined annular surface 56 located adjacent one end of the insert. Inclined surface 56 engages inclined surface 30 of ferrule 26 to force ferrule 26 into its sealing position when the locking arrangement is tightened, as will be more fully described below.

Compression nut 58 has through opening 60 formed therein for receipt of tube 14, ferrule 26, and insert 32 as shown in FIGS. 1–3, 8, 12, and 13. With particular reference to FIG. 3, thread 62 is formed in opening 60 and is for engagement with thread 20 of nipple 12. A camming surface in the form of inclined annular inner surface 64 is located in opening 60 adjacent thread 62. Inclined surface 64 engages inclined surface 38 of insert 32, as will be more fully described below. Further, cylindrical inner surface 66 is located adjacent to and extends inwardly from end 68 of nut 58. With particular reference to FIGS. 8 and 13, end 68 has a plurality of arcuate cutout segments 70 located around its periphery which provide a visual indication that the locking arrangement is in its tightened position, as will be more fully described below. Nut 58 has inclined annular outer surface 73 positioned radially outwardly from inner surface 66 and inclined surface 64 as shown in FIG. 3.

During assembly of arrangement 10, compression nut 58 is first slid onto tube 14 so that the tube is received in opening 60 as shown in FIG. 3. Insert 32 is then slid onto tube 14 so that opening 34 receives the tube as shown in FIGS. 5 and 6. In FIG. 5, the tube is partially inserted into opening 34 with the end of the tube not yet engaging ridge 48 of the insert. Opening 34 of insert 32 is dimensioned so that it fits snugly around the outer surface of the tube and so that insertion of the tube through the opening slightly deflects segments 44 outwardly because of the engagement of ridge segments 50 with the tube as shown in FIGS. 7 and 8. Slits 40 allow this slight outward deflection of segments 44. For example, for a tube having a ⅜ inch bore diameter and a ½ inch outer surface diameter, opening 34 along inner surface 46 has a diameter approximately in the range of 0.506 inches to 0.510 inches, and the distance between intersection line 51 of ridge 48 and inner surface 46 is within the range of approximately 0.014 inches to 0.021 inches. Therefore, the diameter of opening 34 at line 51 is approximately 0.464 inches to 0.482 inches which is smaller than the ½ inch outer surface diameter of the tube. As is apparent, these dimensions will result in a outward deflection of segments 44 as shown in FIGS. 7 and 8. The outward deflection of segments 44 is facilitated by the angle of inclination of ridge surface 54 because the angle provides for gradual outward movement of the segments so that the end of the tube can easily bypass the intersection edge 51 of ridge 48 as shown in FIGS. 5 and 6.

Ferrule 26 is then slid onto tube 14 with inclined surface 30 facing inclined surface 56 of insert 32 as shown in FIG. 8. Stiffener 22 can then be positioned in the bore of the tube if desired as best shown in FIG. 2. The end of the tube is then fitted completely within port 16 of nipple 12 and the insert 32 and ferrule 26 slid toward the nipple so that the ferrule engages inclined surface 18. In this position, inclined surface 30 of ferrule 26 is in contact with inclined surface 56 of insert 32.

Nut 58 is then slid toward nipple 12 and over insert 32 and ferrule 26. Nut 58 is turned so that thread 62 thereof at least partially engages thread 20 of nipple 12 as shown in FIG. 9. It has been found that after one complete revolution of nut 58, tube 14 will be adequately secured to nipple 12 to prevent accidental disengagement of the tube from port 16.

More particularly, if tube 14 is moved away from nipple 12 as shown in FIGS. 9 or 10, inclined surface 38 of insert 32 engages inclined camming surface 64 of nut 58 so that an inward force (as indicated by the arrow in FIG. 10) is applied to ridge 48 to grip the tube and prevent the longitudinal movement away from the nipple. That is, the tube as it is moved longitudinally carries the insert and the ferrule therewith until surface 38 engages surface 64. The steep angle of inclination of inclined surface 52 of the ridge aids in the gripping action of the ridge. It has been found preferable to have inclined surface 38 of insert 32 and inclined surface 64 of nut 58 inclined at an angle of approximately 17 degrees from the aligned longitudinal axes of the nut and insert.

Thus, once nut 58 is at least partially threaded on nipple 12, tube 14 will be prevented from disengagement from the nipple because of the gripping engagement by ridge 48 in response to the engagement of inclined surface 38 of the insert with inclined surface 64 of the nut. The dimensions of opening 34 of insert 32 and the dimensions of ridge 48 are important to ensure that the insert can be easily but snugly slid onto the tube so as to slightly deform segments 44, and further provide a sufficient gripping action in response to longitudinal movement of the tube and engagement of the inclined surfaces 38 and 64 of the insert and nut, respectively.

After nut 58 has been partially thread on nipple 12, it can then be turned to its tightened position as shown in FIG. 12. In its tightened position, ferrule 26 is adequately wedged between tube 14 and port 16 to provide a sufficient seal therebetween. The force is applied to ferrule 26 by the tightening of nut 58. As nut 58 is tightened, the end 72 thereof becomes visible in cutouts 70. End 72 gradually moves toward the end 68 of nut 58. Insert 32 is dimensioned in length so that the end 72 thereof will be flush with the end 68 of nut 58 once the nut has been adequately tightened to provide a proper connection as shown in FIGS. 12 and 13. Therefore, a person using the locking arrangement can visually inspect that a proper connection has been made to prevent leaking of the connection by noting that end 72 is flush with end 68.

Thus, locking arrangement 10 provides structure for preventing accidental disengagement of tube 14 from port 16 once nut 58 has been partially threaded onto the nipple. Further, arrangement 10 provides a visual indicator which allows the person making the connection to ascertain that a proper connection has been effectuated.

Insert 32 is preferably made of a plastic material, especially if the tubing used is also plastic. However, insert 32 can also be made of any other suitable material, for example, metal, if a metal tubing is used. Nut 58 is also preferably made of a plastic material, but can also be made of any other suitable material, for example, metal.

Although arrangement 10 as described above includes the use of a stiffener and a ferrule, these structures are not necessary in order for the insert and nut to operate in conjunction to prevent accidental disengagement of the tube from the port of the nipple. Thus, arrangement 10 can perform its securing function without the need of the ferrule or the stiffener.

Having described the invention, what is claimed is:

1. A locking device for securing a tube within the port of a threaded nipple, the locking device comprising:

a nut having a through opening formed therein, a substantially cylindrical threaded inner surface adapted to be received by the nipple, and a camming surface adjacent to and extending away from said threaded surface;

a locking member comprising a first body section adapted to be positioned over the tube and received within said nut opening, a second body section presenting a substantially cylindrical inner surface and an inclined outer surface positioned for engagement by said camming surface, said second body section having at least one slit formed thereon, a first inclined annular ridge extending from the inner surface of said second body section and facing toward the nipple, a second inclined annular ridge extending from the inner surface of said second body section and intersecting said first ridge, the point of intersection of said first and second ridges forming an annular gripping component characterized by a diameter which is 0.024 to 0.046 inches smaller than the diameter of said second body section inner surface;

an annular sealing ferrule adapted to be positioned over the tube and received within said opening and adapted to be lodged between the tube and the nipple to force a seal therebetween;

said nut, said locking member and said ferrule all being placed on the tube prior to engagement of said nut with the nipple; and whereby, when said nut is threadably received on the nipple by at least one full turn thereon, movement of the tube away from the nipple results in said locking member inclined surface engaging said camming surface to cause said gripper component to tightly engage the outer surface of the tube to prevent disengagement of the tube from the nipple, and wherein said locking member engages said ferrule as said nut is tightened to force said ferrule into a sealing position between the nipple and the tube.

2. The locking device of claim 1 wherein the angle of incline of said first ridge surface is approximately in the range of 57 degrees to 60 degrees and the angle of incline of said second ridge surface is approximately in the range of 30 degrees to 33 degrees.

3. A locking member for receipt within a threaded nut to secure a tube within the port of a threaded nipple when the threads of the nut at least partially engage the threads of the nipple, the locking member comprising:

a generally cylindrical body with a through opening formed therein for receiving the tube, said body having an inclined annular outer surface disposed adjacent one end, said body also having a plurality of slits equally spaced around its periphery and extending from said one end to intermediate locations, said slits separating said inclined surface into arcuate segments;

a annular ridge extending inwardly from a substantially cylindrical locking member inner surface of said opening, said ridge being formed by an intersection of a first inclined annular ridge surface and a second inclined annular ridge surface, said first and second inclined annular ridge surfaces extending from said inner surface, said first inclined ridge surface having an angle of inclination with respect to said locking member inner surface of less than 90 degrees, said first inclined ridge surface facing toward the nipple and said second inclined ridge surface facing in the opposite direction, said first inclined ridge surface having an angle of inclination with respect to said locking member inner surface greater than the angle of inclination of said second inclined ridge surface, said ridge being separated into arcuate segments by said slits;

said annular ridge having a diameter approximately in the range of 0.024 inches to 0.046 inches smaller than the diameter of said inner surface, said annular ridge diameter being slightly smaller than the outer diameter of the tube so that when said locking member receives the tube prior to engagement of the nut with the nipple, said arcuate segments are deflected slightly outwardly;

said locking member being placed on the tube prior to engagement of the nut and the nipple; and whereby when the nut is threadably received by at least one full turn on the nipple, the tube cannot be removed from the locking member unless the nut is threadably disengaged from the nipple to a point wherein less than one full turn of the nut remains on the nipple.

4. The locking member of claim 3 wherein the angle of incline of said first ridge surface is approximately in the range of 57 degrees to 60 degrees and the angle of incline of said second ridge surface is approximately in the range of 30 degrees to 33 degrees.

5. A locking device for securing a tube within the port of a threaded nipple, the locking device comprising:

a nut having a through opening formed therein, a threaded inner surface disposed in said opening and adapted to be threadably received by the nipple, and a camming surface extending away from said threaded surface;

a locking member comprising a first body section adapted to be positioned over the tube and received within said opening, a second body section extending away from said first body section and presenting an inclined surface positioned for engagement by said camming surface, and a gripper component extending from an inner surface of said second body section for engagement with the tube;

wherein said gripper component comprises a ridge formed by the intersection of a first inclined generally annular ridge surface extending from said locking member inner surface and facing a direction toward the nipple and a second inclined generally annular ridge surface extending from said inner surface and facing an opposite direction;

wherein the angle of incline of said first ridge surface with respect to said locking member inner surface is approximately in the range of 57 degrees to 60 degrees and the angle of incline of said second ridge surface with respect to said locking member inner surface is approximately in the range of 30 degrees to 33 degrees.

* * * * *